United States Patent [19]

Van Dover et al.

[11] 4,315,878
[45] Feb. 16, 1982

[54] MANUFACTURE OF BLANKS FOR RECORDING DISCS UTILIZING COEXTRUSION AND BLANKS AND RECORDS MADE THEREBY

[75] Inventors: Dennis W. Van Dover, Monticello; Richard C. Lindmark, Jr., Coon Rapids, both of Minn.

[73] Assignee: H. B. Fuller Company, St. Paul, Minn.

[21] Appl. No.: 111,535

[22] Filed: Jan. 14, 1980

[51] Int. Cl.³ .................... B29C 24/00; B29D 17/00; B29F 3/10; B32B 27/08; B32B 31/30
[52] U.S. Cl. .................................. 264/107; 156/219; 156/220; 156/244.19; 156/244.24; 264/106; 264/171; 264/176 R; 264/210.2; 425/810; 428/65; 428/323; 428/515; 428/520
[58] Field of Search .................... 264/107, 210.2, 171, 264/176 R, 106; 156/219, 220, 244.19, 244.24; 428/65, 515, 520, 323; 425/DIG. 8, 10

[56] References Cited

U.S. PATENT DOCUMENTS

| | | |
|---|---|---|
| 2,039,140 | 4/1936 | Barton . |
| 2,529,683 | 11/1950 | Keefe . |
| 3,072,519 | 1/1963 | Salzman . |
| 3,665,136 | 5/1972 | Westermann . |
| 3,687,769 | 8/1972 | Dague . |
| 3,768,946 | 10/1973 | Matuschke ........................ 425/363 |
| 4,034,033 | 7/1977 | Carrere . |

FOREIGN PATENT DOCUMENTS 856112 12/1960 United Kingdom .................. 428/65

OTHER PUBLICATIONS

Burt, *Journal of Audio Engineering*, vol. 25 (1977), pp. 712-723.
*Chemical Week*, Dec. 20, 1978, pp. 51-52.

Primary Examiner—James C. Cannon
Attorney, Agent, or Firm—Merchant, Gould, Smith, Edell, Welter & Schmidt

[57] ABSTRACT

It has been found that a layered recording disc having an inexpensive core layer and high quality recording groove-accepting outer layers can be made in a relatively simple manner through an application of the technique known as coextrusion, wherein a common die, e.g. a coextrusion die (10) having a die orifice (11) for a plurality of streams (13, 23, and 33) provides a multilayer coextrudate (60) having a plurality of layers (64, 74, and 84). The coextrudate (60) can be cut into segments (60a) with a suitable cutting means (20). The coextrudate segments can be substantially of record thickness with a circular periphery. Alternatively, coextrudate segments (60b) can be much thicker than a record and much smaller in surface area. In either case, segments can be compression molded into discs (100) having the desired profile and/or grooves.

12 Claims, 5 Drawing Figures

MANUFACTURE OF BLANKS FOR RECORDING DISCS UTILIZING COEXTRUSION AND BLANKS AND RECORDS MADE THEREBY

BACKGROUND OF THE PRIOR ART

This invention relates to the art of manufacturing recording discs (phonorecord discs and video discs) and blanks from which such recording discs can be made utilizing known compression molding techniques. An aspect of this invention relates to layered recording discs comprising a core layer and at least one recording groove-accepting thermoplastic layer in adherent contact with the core layer. Still another aspect of this invention relates to the preparation of a layered sheet from which either recording disc-size blanks or relatively thicker, undersize blanks can be made by cutting the sheet into discrete segments. Still another aspect of this invention relates to the layered blanks themselves or layered recording discs produced from these blanks.

Most of the phonorecord discs and video discs produced to carry audio and/or video frequency recordings in their impressed or "stamped" grooves are presently manufactured from a vinyl polymer (including various vinyl copolymers and vinyl arene resins such as polystyrene). In the lexicon of the recording disc art, the term "vinyl" is most often used in reference to vinyl halide homopolymers and copolymers containing at least some vinyl ester units, e.g. polyvinyl chloride and its copolymers, particularly the vinyl chloride-vinyl acetate polymers having a major amount of vinyl chloride units. These polymeric materials are considered to have outstanding recording properties, including the ability to form recording (sound and/or video) grooves with excellent fidelity of sound or video reproduction. The vinyl arene polymers are typically referred to as the "polystyrenes" and, though attractive for economic reasons, are considered to be technically inferior to the vinyl chloride family of polymers, particularly from the standpoint of wear resistance. (The reason for the more favorable economics of the polystyrenes is their more ready adaptability to injection molding techniques.) Still another class of polymers utilized in recording disc manufacture is the acrylic family, particularly polymethylmethacrylate.

In the manufacture of recording discs from vinyl chloride-type polymers, the use of injection molding is not practical. The typical manufacturing techniques involve extrusion of a relatively formless, discrete mass or "biscuit" of hot polymer. The extruder is designed to make "biscuits" of essentially equal mass, whereby each "biscuit" contains just enough material to make a single recording disc (or a slight excess over this amount). The biscuit is conveyed to the pressing device, which applies heat and pressure to the biscuit while impressing the desired recording disc profile and recording grooves upon the hot polymer. Neither the biscuit-pressing technique nor the injection molding technique are well suited to making layered recording discs, although efforts have been made to make laminated phonograph records from a plurality of biscuits; see, for example, U.S. Pat. No. 2,039,140 (Barton), issued Apr. 28, 1936. Other examples of disclosures of laminated phonograph record structures drawn from the U.S. patent literature include: U.S. Pat. No. 3,072,519 (Salzman), issued Jan. 8, 1963, U.S. Pat. No. 3,687,769 (Dague), issued Aug. 29, 1972, and U.S. Pat. No. 3,768,946 (Matuschke), issued Oct. 30, 1973. Additional background information regarding phonograph record manufacture can be obtained from, for example, U.S. Pat. Nos. 2,529,083 (Keefe), issued Nov. 7, 1950, 3,663,136 (Westermann), issued May 16, 1972, and 4,034,033 (Carrere), issued July 5, 1977, and an article entitled "Phonograph Record Compositions" in Volume 15 of the Kirk-Othmer Encyclopedia of Chemical Technology, Second Edition, Interscience Publishers, New York, N.Y., 1967, pages 225 to 231; see also "Chemicals Set Records with 'Oldies'", Chemical Week, Dec. 20, 1978, pages 51 and 52, and *Journal of the Audio Engineering Society*, vol. 25, pages 702 to 895 (1977), particularly pages 716 and 721, and 722.

As pointed out in the Chemical Week article, the vinyl chloride-type polymers account for 80% of the materials used in manufacturing records in the United States, though European firms and video disc manufacturers have shown considerable interest in acrylics. For the smaller, 45-rpm records, polystyrene is more commonly used in the United States, although the industry in some countries prefers vinyl chloride copolymers even for the 45's. A new formulation introduced recently comprises a styrene-vinyl aromatic-acrylic ester copolymer.

Lamination techniques have been used for decades in the manufacture of recording discs such as phonograph records. Prior to the advent of the vinyl resins or polymers in the manufacture of phonograph records, it was a fairly common practice to make phonorecords from a cheap core element and resinous layers on the top and bottom of this element. See, for example, pages 716, 721, and 722 of the previously cited *Journal of the Audio Engineering Society*. This type of layered record and its laminated modern variations (e.g. see the 2,039,140, 3,072,519, 3,687,769, and 3,768,946 patents cited previously) are generally considered more complicated to produce than either the injection-molded polystyrene record or the "vinyl" compression-molded record, both of which are made from discrete quantities of a single polymer or single polymer mixture. According to the aforementioned Chemical Week article, a British company has issued recording discs having decorative pictures included in a laminated structure. The picture is sandwiched between two pieces of film, then covered with polyvinyl chloride film. The process for making these records is said to have a tendency to present handling problems and to be slow and expensive.

SUMMARY OF THE INVENTION

It has now been discovered that a layered recording disc can be manufactured in a relatively simple manner through an application of the technique of "coextrusion". "Coextrusion" has been defined as the "simultaneous extrusion from a single die—not necessarily a single orifice—of two or more homogeneous films, which form a laminar structure with varying degrees of adhesion"; see "History of Co-Extrusion" by Arthur G. Randell, DuPont de Nemours International S.A., 50-52 Rte. des Acacias, 1211 Geneva 24, Switzerland, page 5. Very briefly, this invention involves bringing to a common die an extrudable flow which provides the core layer for the ultimate recording disc product and an extrudable flow comprising a thermoplastic material having good quality in terms of recording groove-accepting properties, and coextruding from the common die a substantially laminar flow of the core material and, in adherent contact therewith, a layer of the recording groove-accepting thermoplastic material (the aforementioned thermoplastic layers suitable for accepting recording grooves are preferably provided on both major surfaces of the core layer). In accordance with this invention, "adherent contact" can be either direct (without any interlayer) or indirect, i.e. using a so-called interlayer adhesive to increase adherent forces. That is, the adherence of the recording groove-accepting thermoplastic layer or layers to the core layer results at least in part from the coextruding step, and, if desired, adherent forces can be increased through the use of "interlayer adhesives", which are actually intermediate, compatible or semi-compatible coextruded thermoplastic layers. The laminar flow which emerges from the common die of the coextrusion apparatus can be cut into discrete segments, each segment containing at least enough material to manufacture a layered record disc. These discrete segments can be either (a) approximately equal in surface area and thickness to a record disc, so that the pressing step or steps merely introduce a record disc profile and recording grooves into the discrete segment (i.e. the record blank) or (b) the segment can be very much thicker and very much smaller in surface area as compared to a record disc, in which case the segment (or blank) is handled in a manner very similar to a conventional biscuit. Alternatively, a biscuit-sized coextrudate can be put through a plurality of compression-molding steps including a first step which impresses the record disc profile and a second step which introduces the grooves. In any case, it is generally desirable to insure that the temperature of the record blank is close to or above the glass transition temperature of the recording groove-accepting thermoplastic material just prior to the compression molding step or steps, so that it will not be necessary to spend time in the press heating the thermoplastic up to this temperature. As will be explained subsequently, the cooling cycle in the press can also be shortened, when a suitably engineered core layer is provided.

In a preferred embodiment of this invention, the coextrudate segment which serves as a disc-like or biscuit-like record blank has a core layer comprising recycled thermoplastic vinyl polymer blended with a significant amount of filler and, in adherent contact with each major surface of the coextruded core layer, coextruded layers consisting of high quality, sound recording-grade vinyl polymer, e.g. single polymers or polymer mixtures comprising virgin vinyl chloride-vinyl acetate copolymer.

It has further been discovered that the foregoing method provides a practical route to a layered record disc which, in concept, is not significantly more complicated than existing techniques of record manufacture. Furthermore, this invention makes a contribution to a solution of several problems in the record manufacturing art.

DETAILED DESCRIPTION

Figure 1:
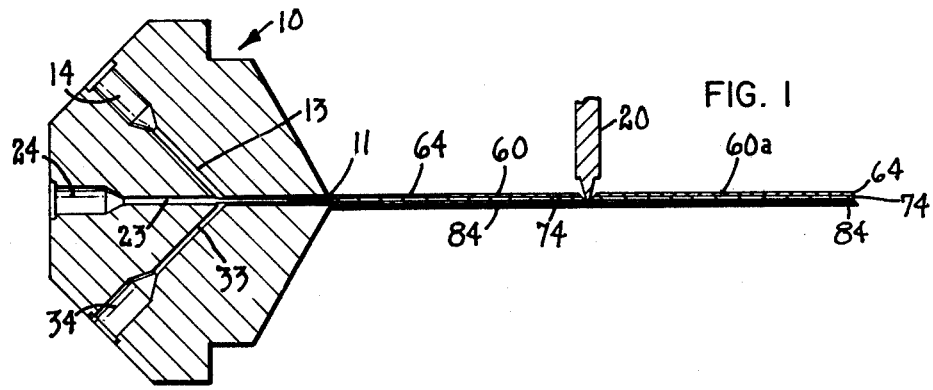
FIG. 1 is a cross-sectional view illustrating a coextrusion die, the coextrudate emerging from the die, and a cutting device for cutting the coextrudate into discrete segments.

The process of this invention can be used to manufacture discs suitable for reading by a stylus or by a laser. The process is also adaptable to a variety of synthetic polymers or resins, including the conventional vinyls (the term "vinyl" being used both in the conventional sense and in the broad sense encompassing polymers having repeating units of the formula $-CHX-CH_2-$, wherein X is halogen, an aromatic group, an ester or alkanoyloxy group, or the like), acrylics (including acrylates), etc. The number of layers produced in the coextrusion step of the process can range from two to about seven or more, depending upon the complexity of the coextrusion die. The preferred layered structure could be described as ABCBA and ACA. The latter of these, ACA is a structure having a core layer C and sound groove-acepting layers A in adherent contact with the core layer C. The ABCBA structure includes interlayer layers B, which are coextrudable compatabilizing layers for improving adherent contact between the C layer and the A layers. That is, indirect adherent contact between core C and layers A is obtained from coextrusion-created adherence assisted by compatibilizing interlayer B.

Several advantages are believed to stem from layered structures produced according to this invention. First, the layered structure permits the use of relatively inexpensive core materials which reduce the overall materials cost of manufacture for phonorecords and video discs. The use of such core material, however, would not result in any sacrifice of wear resistance (particularly likely to be a problem with stylus-read discs) or fidelity of reproduction. On the contrary, new or exotic and relatively superior groove-accepting plastics could be used without serious cost consequences, since the major amount of the record can still be a cheap core material.

Second, the use of a core material permits the simplification of conventional means of recycling unsold or returned or rejected recording discs. At the present time, elaborate procedures are typically used to remove the labels from these substandard or unsold discs, since the presence of even a miniscule amount of paper fibers in the groove areas of a finished product made from recycled material can interfere with fidelity of reproduction (e.g. hissing sounds, "pops", "cracks", and the like). In this invention, the recycled discs can be ground up as is to a particle size suitable for a coextruder feed and used as core material, and there will be substantially no possibility of loss of fidelity of reproduction due to paper fibers in the core. In addition, this invention can simplify the recycling of mold "flash" (excess) and other types of plastic scrap, since such material can always be added to the core.

Third, the layered structures of this invention permit the use of clear (unpigmented) plastic in the surface layers or groove-accepting layers. The conventional practice in the industry is to load the recording disc-forming plastic with sufficient carbon black to produce a recording disc which will be essentially totally black in color on its groove-accepting surfaces. This practice facilitates quality control procedures, e.g. checking the surfaces of the record for imperfections. Unfortunately, the presence of carbon black particles in the recording disc can increase the risk of losses in fidelity of reproduction, since filler particles of any kind tend to produce a hissing sound. In the present invention, the core layer can be pigmented, while the recording groove-accepting layers need not be pigmented. The black color can still show through to the surface and facilitate quality control procedures, but no filler particles or colorant need be present on the surface of the recording disc.

Fourth, multi-layer discs permit the use of color coding techniques and the like (i.e. different colors in the different layers) which can provide a policing means for detecting record piracy.

Fifth, coextrusion permits the introduction of temperature gradient phenomena not presently obtainable with conventional biscuit extruders. It is within the capability of present day coextrusion technology to provide a difference in temperature of as much as 40° or even 45° C. between coextruded layers. For example, the core layer (the C layer) can be made 40° cooler or warmer as compared to the outer layers (the A layers). In this manner, a record disc blank with a heat reservoir or heat sink can be provided. That is, the core layer could be made hotter so as to be a heat source which will keep the groove-accepting layers warm prior to pressing, thereby reducing the heating cycle in the press. This objective can be accomplished more easily with coextrusion, not only because of the layered structure, but also because of the ability to select a different material for the core, which material can have a higher glass transition temperature or $T_g$. Alternatively, the core can be made cooler to provide structural integrity while the surface layers are brought much closer to a molten condition.

Sixth, the core layer can be selected to provide anti-warp properties to the product which emerges from the press. It is a common practice in the record industry to cool the compression-molded record in the press long enough to cool the record down, so that it will resist warping after pressing, e.g. when removed from the press. A convention practice involves circulating a coolant through the press for this purpose. Even shipping and handling can lead to warpage problems, which can be particularly serious for video discs. By building in anti-warp properties in records made according to this invention, energy costs resulting from wide heating and cooling cycles are reduced and, perhaps equally important, record production is increased through shorter cycle times. In addition, storage of the records at temperatures approaching the $T_g$ may have less adverse effect.

Any of the aforementioned desirable core properties can be provided through materials engineering techniques presently available in the arts of coextrusion and "solid phase forming". Some of the desired properties (e.g. a higher $T_g$ for the core) can be provided by selecting polymers, filled resins, or other materials not presently used in record manufacture, since the requirements of high fidelity, wear resistance, ability to accept recording grooves, etc. apply only to the groove-accepting layers and not to the core layer. In addition, "scrapless forming" engineering techniques generally can be used to reduce cycle times, hence the residence time in the press. For example, the record blank can be heated just up to its glass-transition temperature or only slightly higher. With sufficient pressures of the magnitude used in "solid phase forming", a record disc profile and/or recording grooves can be impressed upon the blank with minimal heat input, hence shorter heating and cooling cycles. This approach would be particularly applicable in the case wherein a record profile (see FIG. 2) was impressed upon the blank in a separate step, prior to impressing of the grooves. Grooves can be introduced into a pre-formed, profiled disc more quickly and more easily than into a formless biscuit. Somewhat similar considerations apply in the case of a coextrudate having a thickness close to average record thickness which has been diecut so as to have a circular periphery. The pressing of such a record blank requires considerably less flow of the blank material as compared to the pressing of a biscuit. In other industries, "solid phase forming" has been found to provide a beneficial molecular orientation, hence the potential for weight reduction with substantially the same rigidity and strength.

In the context of this invention, it is generally preferred to coextrude the blank (or to coextrude the sheet from which the blank is made) and press or mold the blank in the same manufacturing facility, optimally in the same production line. Through automated procedures, coextruding and pressing can be carried out substantially continuously, the coextruder providing a continuous feed for blank-forming followed by pressing and other desired record disc-producing steps. In this manner, the elevated temperature of the coextrucate can be, if desired, relied upon to help maintain the temperature of the blank prior to pressing. Alternatively, blanks made from the coextrudate can be allowed to cool and be stored for future record production or shipped to other manufacturing facilities, particularly in those cases in which an integrated, continuous in-plant production from coextrusion to pressing is not practical. Typically, however, such storage or shipping of blanks or preforms (which have cooled to room temperature) will involve a greater energy expenditure in the long run.

As noted previously, materials used to make record discs in accordance with the teachings of this invention are not strictly limited to the conventional vinyls (and vinyls arenes) or acrylics. The core material can be selected with a view toward a wider range of engineering considerations than would normally enter into the selection of a recording groove-accepting material. And by selecting a suitable core material, some of the requirements for the recording groove-accepting material (e.g. warping resistance) can be relaxed somewhat. Furthermore, the range of fillers or extenders which can be included in the core material is almost unlimited compared to those of the recording groove-accepting material. From the standpoint of convenience of manufacture, any solid fillers included in the core material which fillers would be relatively infusible (i.e. would have melting points or softening points well above the melting point of the core material itself and well above any coextrusion temperatures or other processing temperatures) should normally have a particle size fine enough to pass a 40 U.S. mesh screen, more preferably an 80 mesh screen, typical inorganic fillers being fine enough to pass a 325 mesh screen. Organic, fusible extenders or fillers would normally be approximately in the same size range. Among the typical organic fillers would be finely ground scrap plastic, including thermoset, vulcanized, or crosslinked plastic which could be considered to be infusible and would not be expected to form the continuous phase of the core. Ground up scrap vinyls, acrylics, polyolefins, non-crosslinked polydiolefins, cellulosic plastics, and the like, given suitable softening and melting ranges, could on the other hand become part of the continuous phase of the core. The primary continuous phase material for the core is selected in accordance with rheological considerations which insure that it will form an extrudable flow in a practical coextrusion device, and this consideration also applies to recording groove-accepting materials.

If the recording groove-accepting material is to be played or read by a stylus, it will be subjected to loads of several tons per square centimeter, depending upon the size of the stylus and its weight. Such loads far exceed the elastic limit of most thermoplastic materials, but experience has shown that a variety of thermoplastics have the ability to withstand such stresses. Conventional groove sizes and the like are generally dictated by standard record sizes and playing times, and the type of recorded signal (analog audio, analog video, digital audio, or other analog or digital information). A $33\frac{1}{3}$ rpm record, for example, normally has a playing time of about 30 minutes per side, which requires more than about 75 grooves per millimeter of record-playing surface. A video disc rotates at a much higher rate (e.g. 450 rpm) and can have groove widths of less than 3 $\mu$m.

Stylus-read recording groove-accepting thermoplastic resins or plastics are normally selected to have a high modulus or elasticity, good wear resistance, good resistance to warpage, and ease of processibility. The modulus of elasticity should ordinarily be sufficiently high to give enough rigidity to produce at least the full audible sound spectrum from 10 Hz to 20 kHz. (A video signal is, however, in the megahertz range.) A major factor in ease of processibility is the resin viscosity at processing temperatures. A carefully controlled viscosity range is desirable for good molding performance. Too low a viscosity can produce poor quality discs, while too high a viscosity can require lengthy molding cycles leading to excess record manufacturing costs. Polymer or resin viscosity can be determined in a number of ways, e.g. as inherent viscosity in accordance with ASTM test D-123-60, as melt flow using modifications of ASTM D569-59 (Rossi-Peaks flow test) or D1204-54 (Melt Rheometer flow test), and any of the classic viscosity measurements can also be considered. Preferred specific viscosity values have been reported to be in the range of 0.49 to 0.53 (if reported either as inherent viscosity or as relative viscosity of a 1 wt.-% solution in cyclohexane, these values are reported as between 1.5 and 1.6). Polymer performance in a record can be evaluated by several different tests. The toughness of the plastic as judged by the apparent elastic modulus can be determined by a stiffness test (ASTM D747-63). In accordance with this test, a typical acceptable value is generally above about 70 MPa (10,000 psi). With reference to these criteria, known polycarbonates, acetal resins, and even some polyolefins (e.g. polypropylene) are potential recording groove-accepting thermoplastics. Even though some of these known resins may be more expensive than the preferred vinyl chloride-vinyl acetate copolymers, selection of a suitable core material can result in a coextrudate with extremely thin surface layers, thereby reducing the overall cost of the final product, despite the greater expense of the small amount of surface resin material. The total amount of material in a typical $33\frac{1}{3}$ rpm record is normally more than 100 grams (and can approach 200 grams), hence a relatively thick core with relatively thin surface layers could provide a disc wherein more than 50 grams of the total disc weight is inexpensive core material.

It is worth noting, however, that the conventional vinyl copolymers and homopolymer/copolymer mixtures have excellent wear resistance, resistance to warpage, and ease of processibility and provide excellent standards by which other materials can be evaluated. The vinyl copolymers presently preferred by the record industry typically comprise 85–95% by weight of vinyl chloride units and 5 to 15% (preferably 13–15%) by weight of vinyl acetate units, the vinyl acetate acting as a built-in plasticizer which contributes to good molding characteristics without seriously altering the mechanical properties. The optimum relative viscosity (1.0 wt.-% in cyclohexane) is 1.5 to 1.56, and the glass transition temperature is preferably above 50° C. for storability and below 150° C. for adequate flow at reasonable pressing temperatures, the typical $T_g$ range being about 60°–70° C., e.g. 65°–67° C. Although the use of terpolymers is rare, the term "copolymers" should be understood to include terpolymers and and polymers containing even greater varieties of comonomeric units. It should also be understood that polyvinyl chloride homopolymer can be added to the copolymer to provide a mixture with less overall polyvinyl acetate character. Thermal stabilizers (which tie up liberated HCl), lubricants, processing aids, antioxidants, and other additives are conventionally included in the thermoplastic polymer compositions used in compression molding of both video and audio discs.

Turning now to the Drawing, wherein like numerals denote like elements in the various views, FIG. 1 illustrates a typical coextrusion die 10 which is a common die for a plurality of extrudible streams of material, in this case three such streams 13, 23, and 33. In the particular type of coextrusion die shown, the three streams 13, 23, and 33 flow through separate channels 14, 24, and 34, which are configured to provide a laminar flow of three-layer extrudate 60 from die orifice 11. Other types of coextrusion dies are known (e.g. the "feed block" type), and the die of FIG. 1 has been shown in the Drawing because of its simplicity of operation, wherein channels 14, 24 and 34 exert positive control over the thicknesses of the three layers 64, 74, and 84 of coextrudate 60. The flow of the three-layer extrudate 60 from die 10 is "laminar" in the sense that it is smooth, non-turbulent flow in which the three layers are defined with reasonable stability, thereby preventing or mitigating undesirable mixing of layers or poorly defined boundaries between layers. An inherent property of coextrusion is the ability to provide some interlayer adhesive forces even without the use of any coextruded compatibilizing, adhesive-improving interlayer. In a preferred embodiment of this invention, streams 13 and 33 are thermoplastic recording groove-accepting vinyl polymers (preferably vinyl chloride-vinyl acetate copolymer) and stream 23 is obtained from a blend comprising 5–95% by weight ground up scrap vinyl and 95–5% by weight filler particles, the particles being small enough to facilitate extrusion. Since the three streams 13, 23, and 33 are essentially compatible, the coextrusion process itself provides sufficient interlayer adhesion, and no coextruded compatibilizing adherence-improving interlayers are required for extrudate 60. That is, the layers 64, 74, and 84 of extrudate 60 are in direct interfacial adherent contact, as opposed to indirect adherent contact involving a compatibilizing interlayer. If desired, orifice 11 of die 10 can be wider than one blank width or even wider than several blank widths. In the embodiment shown in FIG. 1, however, the width of orifice 11 is such that the width of coextrudate 60 is exactly equal to a single blank width, thereby eliminating the need for longitudinal slitting. It is within the scope of this invention to produce a coextrudate 60 having a thickness approximately equal to record disc thickness, in which case the coextrudate can be diecut with a cutting die having a circular periphery. In the embodiment shown in FIG. 1, however, cutting tool 20 makes a single, straight transverse cut, resulting in rectangular coextrudate segments 60a (see also FIG. 4).

Figure 4:
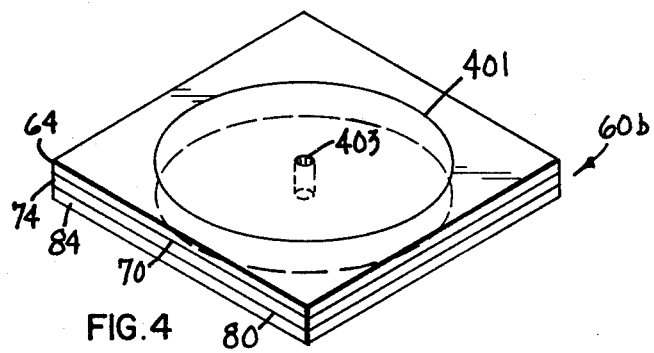
FIG. 4 is a perspective view illustrating an undersized, relatively thick record blank made according to this invention with sufficient control over coextrusion (during manufacture of the blank) to provide stable flow conditions.
Figure 5:
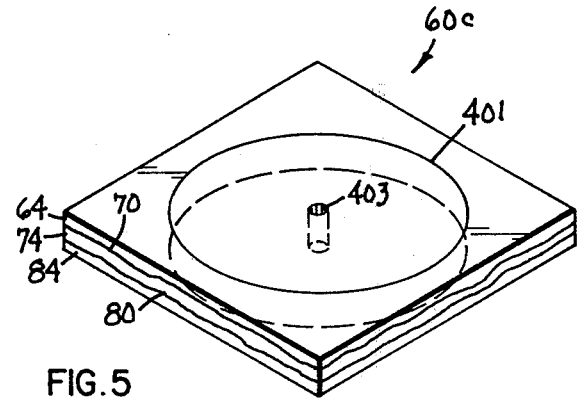
FIG. 5 is similar to FIG. 4, except that the blank was coextruded under incipient interfacial flow instablility conditions.

In FIG. 4, the rectangular coextrudate segment 60b has a core layer 74 and recording groove-accepting thermoplastic layers 64 and 84 in adherent contact with both major surfaces of core layer 74. For convenience of manufacture, the record disc label 401 has been applied to the top surface of extrudate 60b, and a second label 402 (shown in phantom) has been applied to the bottom surface. The location of the hole 403 for the phonograph spindle is also shown in phantom; in accordance with the typical practice of compression molding of biscuits, the hole can be molded into the finished record during pressing or may even be punched out after pressing. FIG. 4 illustrates the production of a coextrudate segment wherein the flow from the coextruder was stable, laminar, and hence well controlled. The interfaces 70 and 80 between layers 64 and 74 and 74 and 84 are substantially planar and substantially parallel to the top and bottom surfaces of coextrudate 60b. This stable flow condition is normally desirable for good quality control. FIG. 5 illustrates the type of interfacial boundaries 70 and 80 which are observed when the coextrudate (in this case coextrudate segment 60c) was formed under conditions of incipient interfacial flow instability. Some of the parallelism of flow lines has not been lost, but the smooth planar character of the interfaces 70 and 80 is no longer present. This indicates a greater risk of uncontrolled mixing of the materials in the various layers, e.g. a risk of migration of some core material from core layer 74 into the groove-accepting regions of layer 64. Because of such risks, it is ordinarily not possible to coextrude multi-layer biscuits in exactly the same manner as conventional single-material biscuits are extruded. In the conventional extrusion process, the extruder is designed to meter out discrete biscuits by forcing discrete amounts of material through the die in an intermittent fashion. In the present invention, it is far more desirable to provide a continuous flow of coextrudate, thereby improving laminar flow control and avoiding interfacial flow instability. Cutting tool 20 (FIG. 1) is timed to provide discrete segments 60a of virtually identical weight, e.g. 50 grams or 140 grams or whatever the weight of the ultimately obtained record disc product will be. A typical practice is to include a gram or two of excess material in each biscuit (or, in the case of this invention, each blank), which excess material typically shows up as mold flash. The mold flash is automatically trimmed off and recycled.

Figure 2:
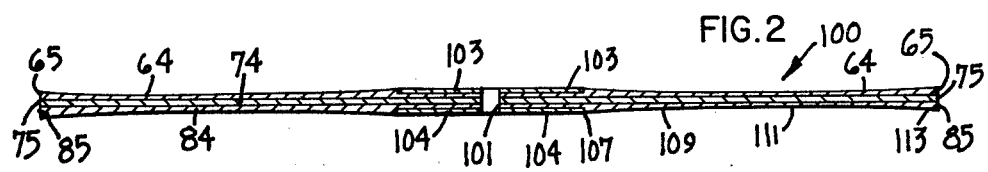
FIG. 2 is a cross-sectional view of a recording disc made according to this invention.

Regardless of whether the record disc blank cut from the coextrudate is a substantially record-thickness blank of circular periphery or a thicker blank having a much smaller surface area (e.g. rectangular blank or coextrudate segment 60b), some sort of impressing or compression molding step can be used to introduce the recording grooves. The greater the surface area of the blank and the closer its thickness is to record disc thickness, the less flow is required during pressing. Conventional presses are designed to provide adequate temperature and pressure for a great deal of flow, since conventional vinyl biscuits are very large in thickness and very small in surface area as compared to a record disc. Accordingly, a conventional press can accept a blank of the type shown in FIG. 4, provided this blank or coextrudate segment 60b is maintained (brought up to or held at) a suitable temperature just prior to entering the mold or press. Typically, the desired temperature is above $T_g$ (e.g. above 60° or 70° C.). If the material (polymer or polymer mixture) in blank 60b (particularly layers 64 and 84) has sufficient crystalline character to have a true melting point, the upper limit on the blank material temperature before (and preferably even during) pressing is ordinarily the melting point of the material. If this material is too amorphous to have a melting point, the upper limit is preferably the "flow point" or "flow temperature", i.e. the temperature at which the polymer molecules glide readily past one another when the material is stretched, with little intramolecular stretching. See Sweeting, The Science and Technology of Polymer Films, Vol. I, Interscience Publishers, New York, N.Y., pp. 460-464. Typical "flow temperatures" are below 250° C., more typically below 200° or even 150° C. A conventional heating/cooling cycle in audio disc compression molding involves heating the press initially to about 150° C. or close to the "flow temperature", quickly cooling the press to 35° or 40° C., so that the record is below $T_g$, e.g. at 40°-55° C., when ejected from the press. If the record disc to be made from the blank will be stylus-read, the presently preferred industrial practice is to introduce a certain prescribed record profile with the molding surface, whereby the thickness of the record varies along its radius. Conventionally, the record profile and the recording grooves are configured into the molding surfaces and impressed in the same compression molding step. However, in the context of this invention, two steps can be used if desired, whereby the profile is introduced in a first compression molding step and the grooves are introduced in a second compression molding step. FIG. 2 illustrates the record profile of a disc made from a three-layer coextruded blank such as blank 60b (FIG. 4). Thus, disc 100 of FIG. 2 is still a blank in the sense that it does not as yet carry any frequency information. An advantage of impressing the profile before impressing grooves is that the amount of flow during the introduction of grooves is reduced to the absolute minimum.

Disc 100 (FIG. 2) is provided with top and bottom labels 103 and 104 and hole 101 for the phonograph spindle. As in blank 60b (FIG. 4) the top and bottom groove-accepting layers are 64 and 84 and the core layer is 74. At the edge of the disc 100, the edges 65, 75, and 85 of layers 64, 74 and 84 can be perceived, even by the naked eye. This characteristic layered structure can provide at least a superficial check on whether the record disc being sold is original with the manufacturer or most probably made from different materials and/or on different equipment, thus indicating the possiblity of piracy. (Record pirates can make a matrix from a single copy of a legitimately sold record.) Near the edge of disc 100, the conventional record profile calls for a thickness of about 1.8 mm, typically 1.78 mm (0.070 inches). This is the thickness at the point along the radius indicated by 113. This is normally the thickest part of the record, the extra thickness being designed to protect the recording grooves, particularly when record discs are piled on top of one another. Thus, the maximum thickness of a record disc is typically less than two millimeters. At the point along the diameter indicated by 111, which is typically on about a 270 mm-diameter circle about the center of the disc, the conventional profile calls for minimum thickness, typically less than about one millimeter, e.g. 0.94 mm (0.037 inches). From this low point, the disc thickness gradually increases until one reaches the point along the diameter indicated by 109, which point is typically on about a 125 mm-diameter circle about the center of the record (e.g. 127 mm). At this point, the record thickness has increased slightly beyond one millimeter but normally less than 1.1 mm, a typical value being 1.07 mm (0.042 inches). At edge 107 of label 103 or label 104, the thickness of the disc is almost back to what it was at 113, a typical thickness being between 1.5 and 2 mm, e.g. 1.73 mm (0.068 inches). In the label area, the thickness decreases again very slightly, e.g. to about 1.6 mm.

Figure 3:
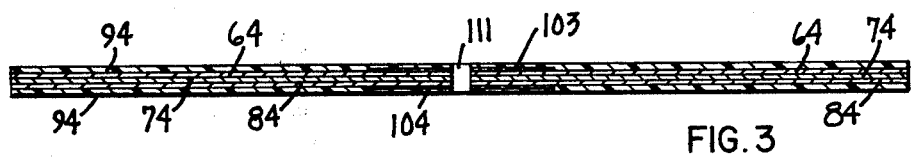
FIG. 3 is a cross-sectional view of another embodiment of a recording disc made according to this invention, which embodiment is particularly well suited for laser reading as opposed to stylus reading.

For convenience of visual inspection for imperfections, core layer 74 can be pigmented with a dark pigment, e.g. carbon black. For greater fidelity of sound or video reproduction, however, layers 64 and 84 can be unpigmented. FIG. 3 shows the cross section of a laser-read disc 200. Since disc 200 was coated with top and bottom protective coatings 94 after pressing, the record profile shown in FIG. 2 is of far less importance, and the thickness of disc 200 can be substantially equal all along its radius. Coatings or layers 94 are unpigmented so as to permit the uninterrupted passage of a beam of light such as a laser beam. Layers 64, 74, and 84 are similar to those of FIG. 2, the recording grooves having been impressed in layers 64 and 84 prior to application of coatings 94.

In any of the compression molding steps of this invention, particularly if molding pressures are higher and temperatures are lower than conventionally used, liquid surface coatings can be used to protect or lubricate the stamper or the surfaces of the disc. If the liquid coating agent has a measurable vapor pressure at normal ambient temperature (e.g. 20°-25° C.), the pressed discs can be wiped off and held out from packaging until the liquid has evaporated. More preferably, the liquid is intended to remain on the disc to provide anti-static properties or the like.

What is claimed is:
1. A coextruded recording disc blank comprising:
(a) a coextruded core layer comprising recycled thermoplastic vinyl polymer blended with 5 to 95% by weight of a filler having a particle size finer than 40 U.S. mesh prior to coextrusion, said coextruded core layer being of less than recording-grade quality in its ability to form high fidelity recording grooves,
(b) in adherent contact with each major surface of said coextruded core layer, a coextruded layer consisting essentially of sound recording-grade vinyl polymer.

2. In the manufacture of a layered record blank having a thickness at its thickest point which is greater than one millimeter and having a solid core comprising core material and, superposed upon and in adherent contact with a major surface of said core layer, a solid thermoplastic layer comprising recording groove-accepting thermoplastic material, the method comprising:
continuously bringing to a common die an extrudable flow comprising said core layer material and an extrudable flow comprising said recording groove-accepting thermoplastic material, and
continuously coextruding from said common die a substantially laminar flow which is thicker than about one millimeter and which comprises a first layer comprising said core material and, in adherent contact therewith, a second layer comprising said recording groove-accepting thermoplastic material, the adherence of said adherent contact resulting at least in part from said coextruding step.

3. A method according to claim 2 wherein said laminar flow is cut into discrete segments, each said segment contained at least sufficient material to manufacture a layered record blank, and wherein a layered record disc is manufactured from a said segment.

4. A method according to claim 3 comprising the steps of:
bringing to said common die a pair of extrudable flows comprising said recording groove-accepting thermoplastic material, and, interposed between said pair of extrudable flows, an extrudable flow comprising said core material, and
coextruding from said common die a laminar flow comprising a first layer comprising said core material and, in adherent contact with each major surface of said first layer, second and third layers comprising said recording groove-accepting material, the adherence of said adherent contact resulting at least in part from said coextruding step.

5. A method according to claim 4 wherein the said adherent contact results in part from a coextruded compatibilizing interlayer interposed between said layers.

6. A method according to claim 3 wherein a said layered record blank is manufactured by: (a) maintaining a said segment at a temperature above the glass transition temperature of said recording groove-accepting thermoplastic material, and (b) impressing recording grooves in a said thermoplastic layer comprising said recording groove-accepting themoplastic material, before said thermoplastic layer cools to a temperature below said glass transition temperature.

7. A method according to claim 2 wherein the substantially laminar flow has a thickness greater than 1.5 mm and is diecut to form a blank having a circular periphery.

8. A record blank made according to the process of claim 2.

9. The method of forming a record disc from the blank produced from the process of claim 1 comprising the steps of claim 1 plus the additional steps of:
(a) maintaining a coextruded record disc blank comprising a core layer and a recording groove-accepting thermoplastic surface layer in adherent contact with each major surface of said core layer at a temperature above the glass transition temperature of the said surface layers in said record disc blank, and
(b) impressing recording grooves in said coextruded record disc blank while said record disc blank is at a temperature above said softening point and below said melting point.

10. A method according to claim 9 wherein said impressing step also impresses a varying thickness profile upon said record disc blank, whereby the minimum thickness of the resulting layered record disc is less than 1.5 mm and the maximum thickness is greater than 1.5 mm.

11. A method according to claim 9 wherein said coextruded record disc blank is, prior to said step (b), compression molded into a varying thickness profile, whereby the minimum thickness of the resulting compression-molded coextruded record disc blank is less than 1.5 mm and the maximum thickness is greater than 1.5 mm.

12. A record disc made according to claim 9.

* * * * *

UNITED STATES PATENT AND TRADEMARK OFFICE
CERTIFICATE OF CORRECTION

PATENT NO. : 4,315,878
DATED : February 16, 1982
INVENTOR(S) : DENNIS W. VAN DOVER et al It is certified that error appears in the above-identified patent and that said Letters Patent are hereby corrected as shown below:

In column 5, line 46, for "convention" read --conventional--.
In column 6, line 32, for "coextrucate" read --coextrudate--.
In column 6, line 47, for "vinyls" read --vinyl--.
In column 10, line 52, for "theintroduction" read --the introduction--.
In column 10, line 64, for "possiblity" read --possibility--.
In column 12, line 17, for "contained" read --containing--.
In column 12, line 46, for "the" read --said--.

Signed and Sealed this

Thirteenth Day of July 1982

[SEAL]

Attest:

GERALD J. MOSSINGHOFF

Attesting Officer    Commissioner of Patents and Trademarks